(12) United States Patent
Umakanth et al.

(10) Patent No.: US 12,126,855 B2
(45) Date of Patent: Oct. 22, 2024

(54) SYSTEM AND METHOD FOR AUDIOVISUAL CONTENT ANALYSIS ON EDGE DEVICES

(71) Applicant: VERIZON PATENT AND LICENSING INC., Basking Ridge, NJ (US)

(72) Inventors: Adithya Umakanth, Hyderabad (IN); Balagangadhara Thilak Adiboina, Princeton, NJ (US); Deepak Kumar, Punjab (IN); Shubra Jain, Etah (IN); Manish Anand, Bihar (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 205 days.

(21) Appl. No.: 17/967,672

(22) Filed: Oct. 17, 2022

(65) Prior Publication Data

US 2024/0129577 A1 Apr. 18, 2024

(51) Int. Cl.
*H04N 21/434* (2011.01)
*G06F 16/783* (2019.01)
*G06N 20/00* (2019.01)

(52) U.S. Cl.
CPC ....... *H04N 21/4343* (2013.01); *G06F 16/783* (2019.01); *G06N 20/00* (2019.01)

(58) Field of Classification Search
CPC ... H04N 21/4343; G06F 16/783; G06N 20/00
See application file for complete search history.

(56) References Cited

U.S. PATENT DOCUMENTS

| | | | |
|---|---|---|---|
| 2014/0101550 A1* | 4/2014 | Zises | H04N 21/6581 715/721 |
| 2020/0065425 A1* | 2/2020 | Menguy | G06Q 30/0631 |
| 2020/0273463 A1* | 8/2020 | Sui | G10L 15/1822 |
| 2021/0111736 A1* | 4/2021 | Jiang | G06N 3/045 |
| 2021/0125380 A1* | 4/2021 | Lee | H04N 19/117 |
| 2024/0078414 A1* | 3/2024 | Koyuncu | G06N 3/0464 |

* cited by examiner

*Primary Examiner* — Nicholas T Corbo

(57) ABSTRACT

Techniques for analyzing audiovisual content, such as streaming content are disclosed. In one embodiment, a method is disclosed comprising obtaining a frame of audiovisual content, using a video decoder to decode compressed model weights of at least one trained model, using the at least one trained model with the decoded weights to analyze the frame and extract content based on the analysis, using the extracted content to make a determination that the audiovisual content comprises a category of content, and causing actionable information to be transmitted to a client device of a user in response to the determination that the audiovisual content comprises the category of content.

20 Claims, 8 Drawing Sheets

SYSTEM AND METHOD FOR AUDIOVISUAL CONTENT ANALYSIS ON EDGE DEVICES

BACKGROUND INFORMATION

Access to audiovisual content, such as streamed content, has become ubiquitous with the use of a variety of networked devices, e.g., smartphones, smart TVs, set-top-boxes, broadband home routers, etc.

DETAILED DESCRIPTION

The disclosed embodiments provide novel systems and methods for analyzing audiovisual content, such as streaming content. As discussed herein, according to some embodiments, the disclosed systems and methods analyze frames of audiovisual content to detect and extract content from the frames to accurately identify advertised products, for example, and for providing viewers with the ability to obtain more information about the product. In some embodiments, the detection is performed using a number of models, such as trained machine learning models, or the like. In accordance with embodiments of the present disclosure, a trained model can be a neural network, such as a convolutional neural network (CNN). In accordance with one or more embodiments, a trained model can be a tinyML (tiny machine learning) model. In accordance with one or more embodiments of the present disclosure, novel compression/decompression techniques can be used to compress/decompress model weights learned in training the machine learning model.

Figure 1:
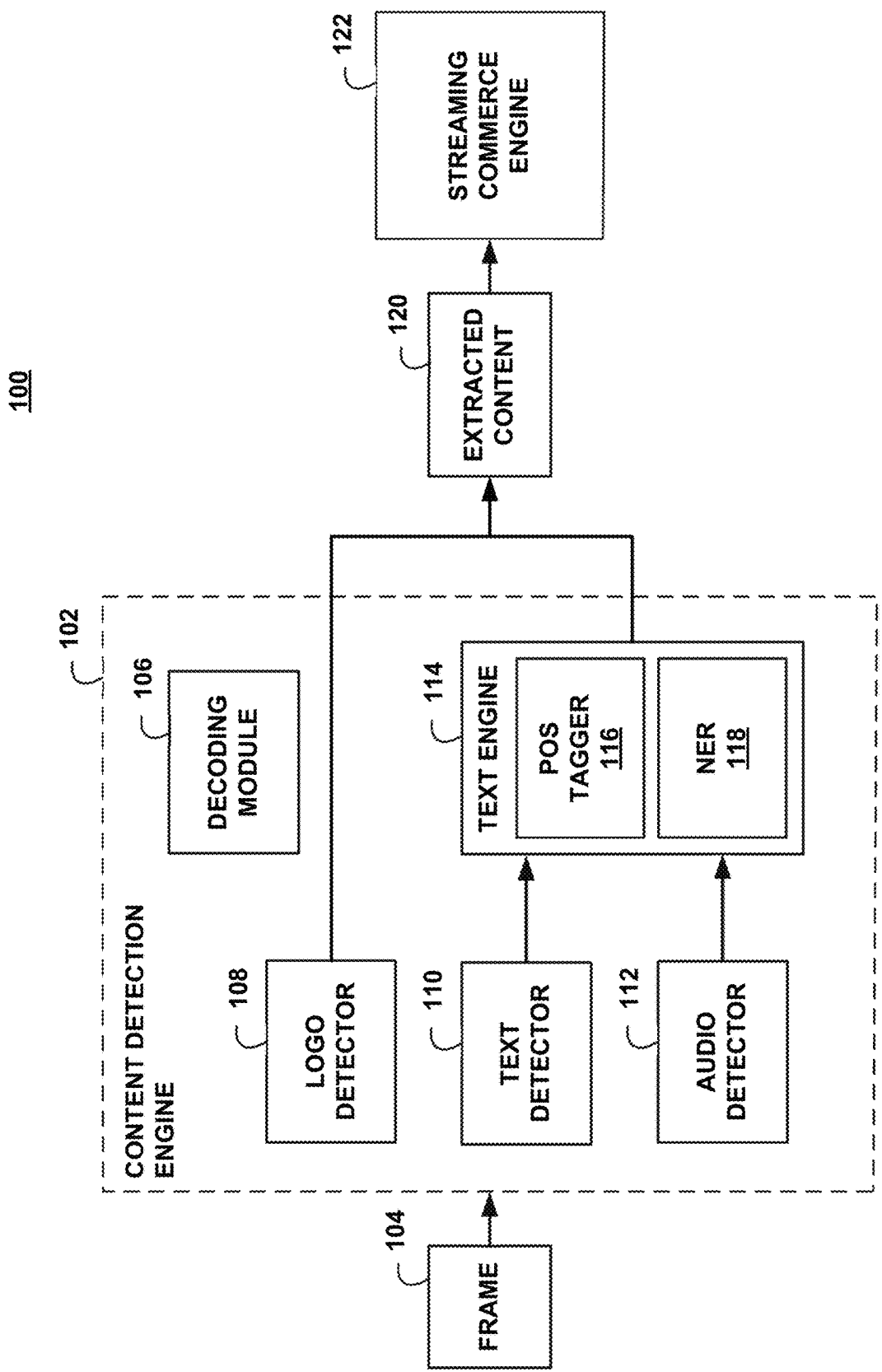
FIGS. 1 and 2 provide examples illustrating exemplary components used in accordance with one or more embodiments of the present disclosure.
Figure 2:
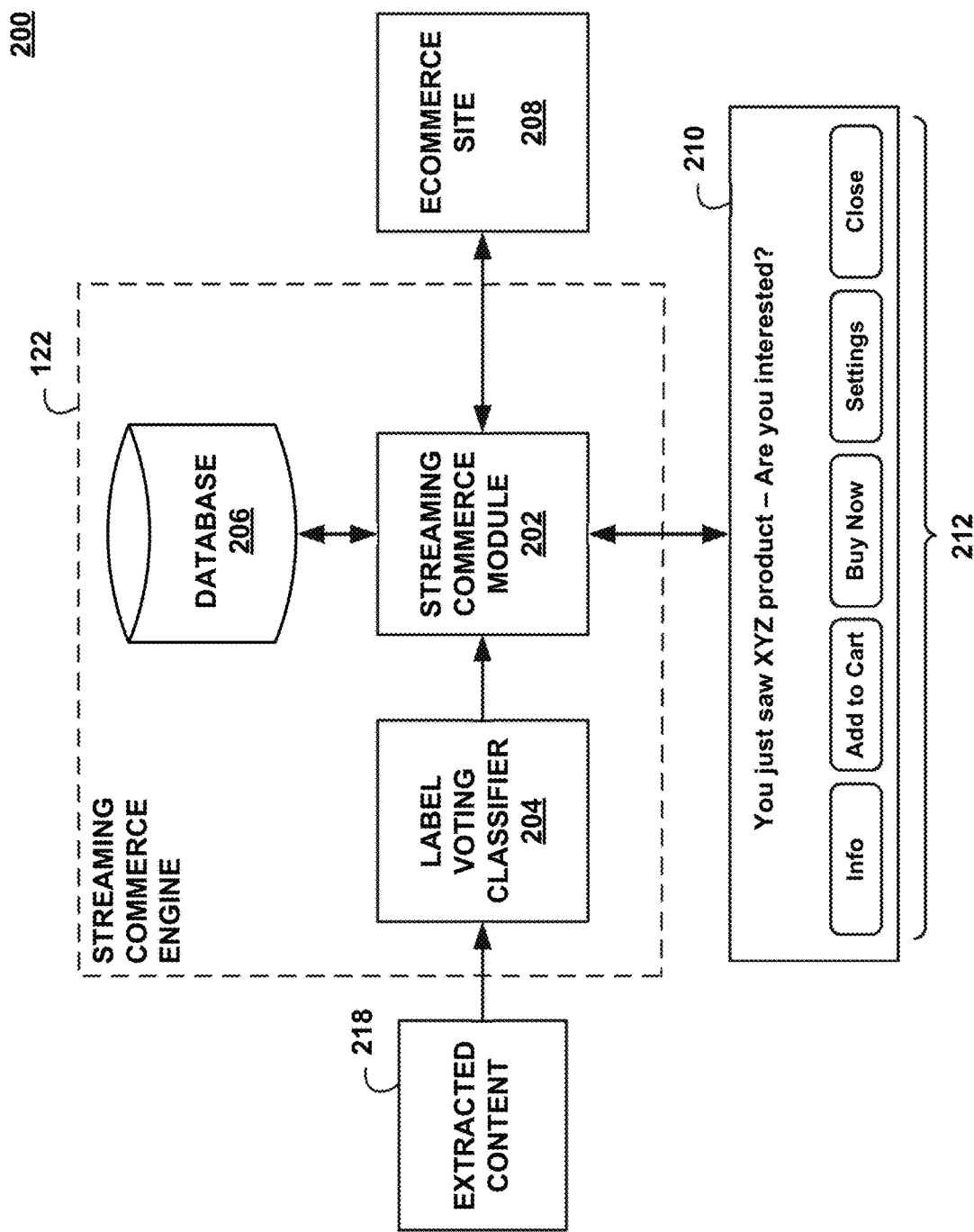

FIGS. 1 and 2 provide examples illustrating exemplary components used in accordance with one or more embodiments of the present disclosure. With reference to FIG. 1, example 100 includes a content detection engine 102 and a streaming commerce engine 122. In accordance with one or more embodiments, content detection engine 102 can analyze each of a number of frames from audiovisual content (e.g., streaming content) to generate extracted content 120, which becomes input to streaming commerce engine 122.

In accordance with one or more embodiments, content detection engine 102 comprises a number of trained models for use in analyzing a frame, e.g., frame 104, and generating extracted content 120 based on the analysis. In accordance with one or more embodiments, one or more of the trained models (as well as updates to one or more trained models) can be stored at a cloud computing device (e.g., a multi-access edge computing (MEC) device, server, etc.) and transmitted to content engine 102, streaming commerce engine 122, etc. via one or more networks. By way of a non-limiting example, the one or more networks can comprise a mobile network, such as a fifth-generation (5G) mobile network), fourth-generation (4G) mobile network, etc.

By way of some non-limiting examples the trained models can include logo detector 108, text detector 110 and audio detector 112. Logo detector 108 can be trained to detect image data representing a logo (e.g., a product logo). Text detector 110 can be trained to detect text in the image data from frame 104. By way of a non-limiting example, text detector 110 can be trained to analyze image data from frame 104, detect text in the image data and extract the detected text. Audio detector 112 can be trained to detect text in the audio data from frame 104. By way of a non-limiting example, audio detector 112 can be trained to analyze audio data from frame 104, detect text in the audio data and extract the detected text.

In accordance with one or more embodiments, text detector 110 can be trained to detect irregularly-shaped text characters using character-level analysis. The character-level analysis can be implemented using CRAFT (Character Region Awareness For Text) detection, which comprises a CNN trained to provide a character region score used to localize individual characters (e.g., identify a region within the image data for each character) and an affinity score used to group each character into a single instance. Each character's region score and affinity score can be used, by CRAFT, to assign the character to a given instance. The characters forming an instance can be analyzed together, by CRAFT, to identify each irregularly-shaped character assigned to the instance.

In accordance with one or more embodiments, content detection engine 102 can comprise a text engine 114 comprising a part-of-speech (POS) tagger 116 and a name entity recognizer (NER) 118, each of which can be trained machine learning models. In accordance with one or more embodiments, NER 118 can be used to analyze the text detected by text detector 110 and/or audio detector 112 to generate name entity information comprising each named entity identified from the analysis performed by NER 118. By way of a non-limiting example, NER 118 can be Stanford's NER.

In accordance with one or more embodiments, POS tagger 116 can be used to analyze the text detected by text detector 110 and/or audio detector 112 to generate POS information identified from the POS analysis. By way of non-limiting example, the POS information can comprise a tag identifying a part of speech corresponding to a word from the text detected by text detector 110 and/or audio detector 112. By way of a further non-limiting example, POS tagger 116 can comprise a natural language processing toolkit (NLTK) POS tagger or Stanford's Log-Linear POS tagger.

In accordance with one or more embodiments, POS tagger 116 and NER 118 can be used to analyze the text from text detector 110 and/or audio detector 112 and identify names of entities (companies, organizations, etc.) whose products (and/or services) are likely to be advertised in content being analyzed by content detect engine 102. By way of a non-limiting example, POS tagger 116 can be used to identify nouns which can correspond to a name of an entity identified using NER 118.

As is disclosed in more detail below, in accordance with one or more embodiments, one or more of the trained models used by content detection engine 102 and/or streaming commerce engine can comprise model weights compressed (or encoded) using an encoding module. In accordance with one or more embodiments, the model weights can be compressed using a video encoder, or video codec. In accordance with one or more embodiments, decoding module 106 can comprise a video decoder (or video codec) to decompress the model weights before the trained model is used.

As discussed herein, the trained model(s) can be stored and/or used by a device, such as a set-top-box (STB), a MEC device, or other device having limited data storage capacity. The amount of data storage needed to store the trained model can be optimized by compressing (or encoding) the model weights before storing them in the device's data storage. Additionally, in accordance with one or more embodiments, model weight quantization can be used to reduce the size of a trained model, thereby reducing the storage needs of the trained model, as is discussed.

In accordance with one or more embodiments, a MEC device can store a trained model (with the model weights) for distribution to another device, such as a STB, which can be configured to perform in a manner discussed in connection with one or more embodiments.

In accordance with one or more embodiments, a MEC device can distribute data, such as user preferences, product catalog information, etc. to a device (e.g., a STB) for use by content detection engine 102 and/or streaming commerce engine 122 executing on the device.

In accordance with one or more embodiments, a MEC device can comprise the content detection engine 102 and/or the streaming commerce engine 122 and can use the trained models of the content detection engine 102 and streaming commerce engine 122 in accordance with one or more disclosed embodiments.

In accordance with one or more such embodiments, the MEC can communicate with the STB, a client device or the like using one or more networks. By way of a non-limiting example, the 5G mobile network, with its low latency, can be used as one of the networks.

With reference to FIG. 2, in example 200, streaming commerce engine 122 can analyze extracted content 218 to make a determination whether or not the audiovisual content comprises a certain category of content (e.g., advertising content) based on the analysis. In accordance with one or more embodiments, extracted content 218 can comprise extracted content 120 corresponding to frame 104 as well as extracted content 120 corresponding to one or more other frames (e.g., one or more frames previously analyzed by content detection engine 102 and/or streaming commerce engine 122).

In accordance with one or more embodiments, extracted content 218 can comprise image data representing a product logo detected by logo detector 108, POS information and named entity information identified by analyzing the text detected by text detector 110 and/or audio detector 112. Streaming commerce engine 122 can analyze extracted content 218 to make a determination whether or not the audiovisual content comprises a certain category of content, e.g., advertising content.

In accordance with one or more embodiments, streaming commerce engine 122 can comprise a label voting classifier 204, which can analyze the extracted content 218 and identify a product (or service) based on the analysis. By way of a non-limiting example, the extracted content 218 analyzed by label voting classifier can comprise information identifying a logo corresponding to a product (e.g., a Pepsi® logo) and the POS information and/or NER information can comprise information identifying a number of words, such as a name/noun corresponding to the product, a verb (e.g., drink, drinking, etc.) indicating an action corresponding to the product, etc.

By way of a further non-limiting example, the extracted content 218 analyzed by label voting classifier 204 can comprise information identifying a logo used for a brand of toothpaste (e.g., Colgate®) and the POS information and/or NER information can comprise corresponding information (e.g., teeth, brushing, toothpaste, etc.).

In accordance with one or more embodiments, label voting classifier 204 can analyze the extracted content 218 (corresponding to a number of frames 104 analyzed by content generation engine 102) and provide information identifying the product and a probability that the information analyzed by label voting classifier 204 corresponds to the identified product. By way of a non-limiting example, label voting classifier 204 can be configured to identify a product using more than one frame 104 and the probability provided by label voting classifier 204 can be based on the number of frames 104 used to identify the product.

Label voting classifier 204 can provide the information as output to streaming commerce module 202. Streaming commerce module 202 can be configured to make a determination whether or not the audiovisual content (comprising the frame(s) 104 from which the extracted content 218 is generated) comprises a certain category of content (e.g., advertising content) using the probability provided by label voting classifier 204 and a threshold probability.

By way of a non-limiting example, streaming commerce module 202 can determine that the audiovisual content comprises the certain category of content (e.g., advertising content) by comparing the probability to the threshold probability and determining that probability satisfies (e.g., is at least equal to) a threshold probability.

Based on the determination that the probability satisfies the threshold probability, streaming commerce module 202 can cause actionable information to be transmitted to a client device of a user. By way of a non-limiting example, the actionable information can comprise a user interface (e.g., user interface 210) that streaming commerce module 202 can cause to be transmitted to and/or displayed at the client device of a user in response to the determination that the audiovisual content comprises a certain category of content. By way of a non-limiting example, the certain category of content can be advertising content, e.g., content advertising a product identified by label voting classifier 204 using extracted content 218. User interface 210 can comprise a set of controls (e.g., buttons) 212 enabling the user to take an action in connection with the identified category of content (e.g., advertising content. By way of a non-limiting example, the user interface 210 can enable the user to take an action in connection with the identified product.

By way of some non-limiting example, a set of actions can correspond to the set of controls 212, where the set of actions can comprise obtaining information about the identified product (from the advertising content) using an "Info" control, adding the identified product to an online shopping cart using an "Add to Cart" control, buy the identified product via a "Buy Now" control, update user preferences via a "Settings" control and close the user interface 210 using a "Close" control.

In accordance with one or more embodiments, in response to user input indicating selection of the "Info" control, streaming commerce module 202 can direct the user to a product information page of an electronic commerce (or eCommerce) site 208 using browser software native to the user device. In response to user selection of the "Add to Cart" control, streaming commerce module 202 can add the identified product to an online shopping cart of the user at eCommerce site 208. In response to user selection of the "Buy Now" control, streaming commerce module 202 can prompt the user for information to complete the purchase (e.g., payment and delivery address information) in correspondence with eCommerce site 208. In response to user selection of the "Settings" control, streaming commerce module 202 can provide a display (not shown) prompting the user to provide/update settings corresponding to the user's account with the eCommerce site 208.

In accordance with one or more embodiments, database 206 can comprise information about a number of products, including the product identified by label voting classifier 204. By way of a non-limiting example, database 206 can comprise a mapping between a product and the product's universal resource locator (URL) at eCommerce site 208. By way of a further non-limiting example, database 206 can comprise information identifying an API that can be used to retrieve information about the identified product from the eCommerce site 208. In accordance with one or more embodiments, streaming commerce module 202 can use the APIs of a number of eCommerce sites 208 to determine the price of the identified product at each eCommerce site 208. Streaming commerce module 202 can provide the information to the user so that the user can select the eCommerce site 208 for purchasing the product.

In accordance with one or more embodiments, the user device (e.g., mobile phone, smartphone, tablet, laptop, smart TV, etc.) can display the audiovisual content as well as actionable information (e.g., the user interface 210). In accordance with one or more embodiments, user device can be configured to provide some or all of the functionality (e.g., content detection engine 102, streaming commerce engine 122 etc.) described in connection with one or more embodiments disclosed herein.

In accordance with one or more embodiments, at least some functionality can be provided by a computing device in communication with the user device. By way of a non-limiting example, the computing device can be a set-top-box (or other computing device, such as a cloud computing device, a content streaming device, broadband home router or the like) configured to receive the audiovisual content and provide (e.g., via a local area network) it to the user device.

As discussed, in accordance with one or more embodiments, model weights learned in training a model, such as one of the models discussed herein, can be compressed to reduce the size of the model. Before the model is used, the compressed weights can be decompressed (e.g., using decoding module 106). In accordance with one or more embodiments, a video codec, such as an HVEC (High Efficiency Video Coding) encoder/decoder (or codec), can be used to encode/decode model weights, where the model weights are treated as image data by the encoder/decoder. In accordance with one or more embodiments, the video codec's compression rate and loss rate can be adjusted using a quantization parameter (QP).

In accordance with one or more embodiments, pruning and quantization can be used to further compress a trained model. Pruning can be used to reduce the size of a trained model by identifying and removing (from the model) redundancies, such as computations, nodes, channels and/or filters not important to the overall performance of the model.

Quantization can be used to reduce the precision of model weights learned in training a model thereby reducing the size of the trained model. Data storage of the trained model at a device can be optimized by reducing the precision of the model weights and/or compressing (or encoding) the model weights before storing them in the device's data storage. By way of a non-limiting example, each model weight learned in training a model can be a 32-bit floating number. Quantization can be used to reduce the precision to an 8-bit, 10-bit, 12-bit, etc. integer. Some non-limiting examples of quantization techniques that can be used include asymmetric and symmetric quantization. In accordance with one or more embodiments, the degree to which model-weight precision is reduced can be based on a predetermined threshold level of accuracy of the model output.

A quantization technique can map a first range of model weights (e.g., learned model weights) to a second range (e.g., quantized model weights). Asymmetric quantization uses unsigned integers for the second range (e.g., a range such as [0, 255] with 8-bit precision) along with a zero point, Z, which specifies which value in the second range maps to the value of 0 in the first range. Symmetric quantization uses signed integer ranges (e.g., ranges such as [−128, 127] and [−127, 127] with 8-bit precision). Both asymmetric and symmetric quantization use a scaling factor, s, to map a first range of values (e.g., 32-bit floating point model weights) to a second range of values (e.g., 8-bit integer quantized model weights).

To illustrate, a data structure referred to as a tensor can be used to store a set of model weights (e.g., model weights used in a layer of a model) for example. The first value range can correspond to a range of floating point model weights, $f_{min}$, $f_{max}$, with a minimum weight value, $f_{min}$, and a maximum weight value, $f_{max}$. By way of some non-limiting examples, using an 8-bit integer precision, the second range can be [0-255] in asymmetric quantization mode and can be [−128 to 127] or [−127, 127] in symmetric quantization mode.

Quantization can be used to "map" the first range of floating point model weights, $f_{min}$, $f_{max}$, to a second range, $q_{min}$, $q_{max}$, of quantized model weights. Both asymmetric and symmetric quantization use a scaling factor, s. Asymmetric quantization uses a zero point, Z, which maps a value in the first range to a value in the second range. In symmetric quantization, the zero point, Z, can be 0 indicating that the value of 0 in the first range maps to 0 in the second range.

In asymmetric quantization, the scaling factor, s, can be determined by mapping the lowest and highest value in the first range to the highest and lowest value in the second range. The following provides an example for determining the scaling factor, s, for asymmetric quantization:

$$s = (2^n - 1)/f_{max} - f_{min}' \qquad \text{Equation (1)}$$

where n is the number of bits (e.g., 8 bits) used for the second range. In asymmetric quantization, the scaling factor, s, can be used to determine a mapping between the zero points in the first and second ranges. Assuming for the sake of example that $f_{min}$ from the first range is mapped to 0 in the second range, a zero-point value, Z, can be determined as follows:

$$Z = f_{min} * s \qquad \text{Equation (2)}$$

With asymmetric quantization, a quantized value, q, in the second range can be determined using a value, f, from the first range, a scaling factor, s, and a zero point, Z, using the following:

$$q = \text{round}[(s*f) - Z] \qquad \text{Equation (3)}$$

By way of a non-limiting example, f can be a model weight (e.g., a 32-bit floating point number) learned in training a model, and q can be a quantized model weight (e.g., an 8-bit integer).

In symmetric quantization, the zero point in both the first and second ranges is typically set to 0, such that Z=0. As such, with symmetric quantization, a quantized value, q, in the second range can be determined using a value, f, from the first range and the scaling factor, s, using the following:

$$q = \text{round}[(s*f)] \qquad \text{Equation (4)}$$

With symmetric quantization, in determining the scaling factor, s, the second range can be mapped to an alternate first range determined based on the first range. The alternate first range can be designated as $[-\max(|f|), \max(|f|)]$, where $\max(|f|)$ is the greater of the absolute value of $f_{min}$ and the absolute value of $f_{max}$. Using the alternate first range, the scaling factor, s, can be determined using the following:

$$s = QR/\max(|f|)' \qquad \text{Equation (5)}$$

where the value of QR can depend on whether the quantized range is a full range (e.g., [−128, 127] where n=8) or a restricted range (e.g., [−127, 127] where n=8). Where a full range is used, QR can be determined as follows:

$$QR = (2^n) - \tfrac{1}{2} \qquad \text{Equation (6)}$$

Where a restricted range is used, QR can be determined as follows:

$$QR = 2^{n-1} - 1 \qquad \text{Equation (7)}$$

Embodiments of the present disclosure use symmetric quantization for purposes of illustration. It should be apparent, however, that embodiments of the present disclosure can use any quantization technique now know or later developed to reduce model-weight precision from a first precision used for a first range of model weights to a second precision used for a second range of model weights.

Figure 3:
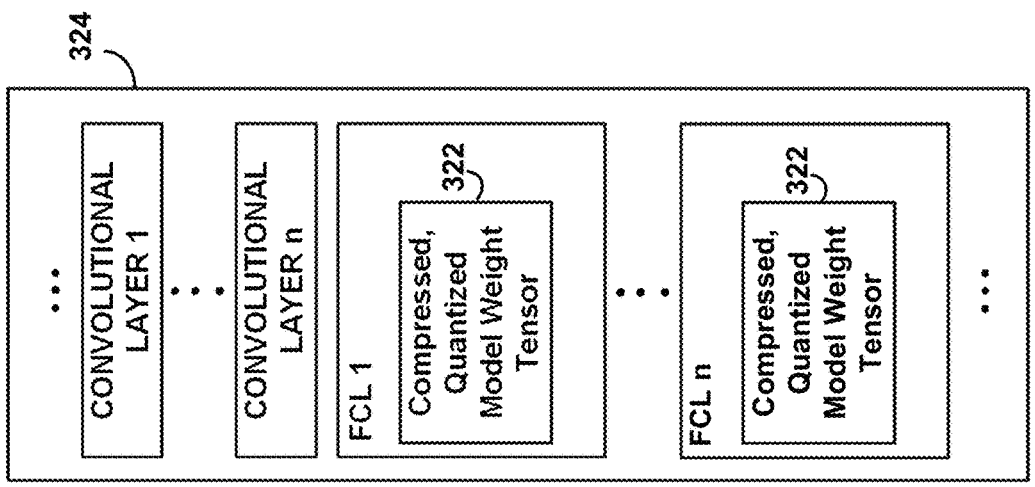
FIG. 3 provides some examples of CNNs used in accordance with one or more embodiments of the present disclosure.
Figure 3:
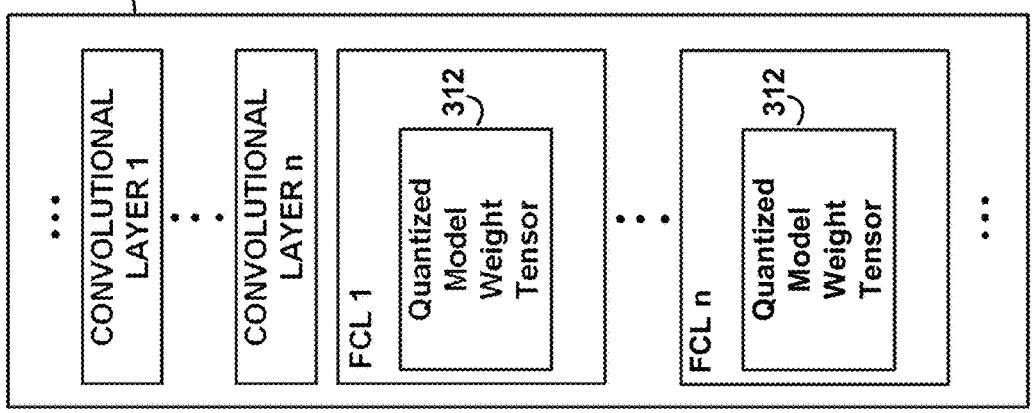
Figure 3:
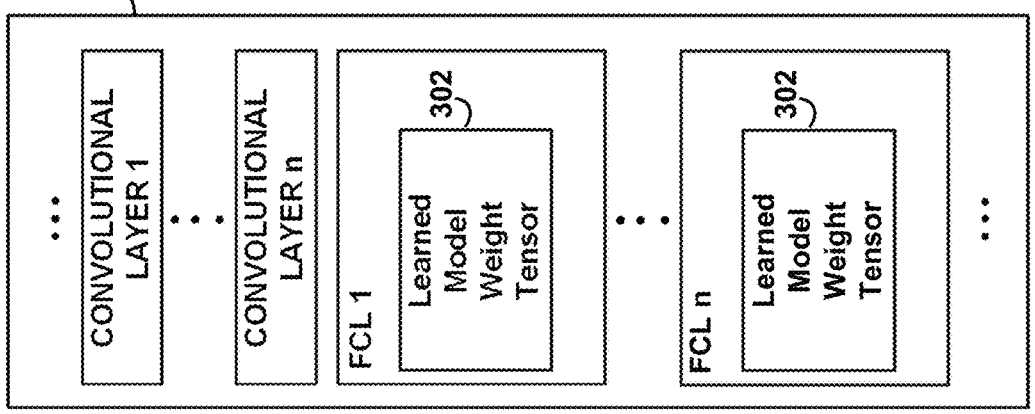

FIG. 3 provides some examples of CNNs used in accordance with one or more embodiments of the present disclosure. Example 300 of FIG. 3 includes CNNs 304, 314 and 324, each comprising a number of convolutional layers and fully connected layers (FCLs). Each FCL in CNN 304 includes a learned model weight tensor 302 comprising learned model weights. By way of a non-limiting example, each model weight can be a 32-bit floating point value.

In accordance with one or more embodiments, a quantization technique, such as symmetric quantization, can be used with quantization values comprising a scaling factor, s, and a zero point, Z The quantization values can be used to map each learned model weight value (in learned model weight tensor 302) to a quantized model weight value (in quantized model weight tensor 312). By way of a non-limiting example, each quantized model weight value can be an 8-bit integer value.

In accordance with one or more embodiments, each FCL in CNN 314 includes a quantized model weight tensor 312 determined using a learned model weight tensor 302 from a corresponding FCL in CNN 304 and a quantization technique, such as symmetric quantization.

In accordance with one or more embodiments, each quantized model weight tensor 312 can be converted to a compressed, quantized model weight tensor 322. By way of a non-limiting example, each model weight in compressed, quantized model weight tensor 322 can be an unsigned, integer with the same precision (e.g., 8 bits) as the model weights in quantized model weight tensor 312.

In accordance with one or more embodiments, each compressed, quantized model weight tensor 322 can be generated using a video codec, such as an HVEC, with a tensor of unsigned integer model weights (generated using a quantized model weight tensor 312) as input. As discussed, in accordance with one or more embodiments, the video codec's compression rate and loss rate can be adjusted using a quantization parameter (QP). In accordance with one or more such embodiments, each FCL in CNN 324 includes a compressed, quantized model weight tensor 322 corresponding to a quantized model weight tensor 312.

Figure 4:
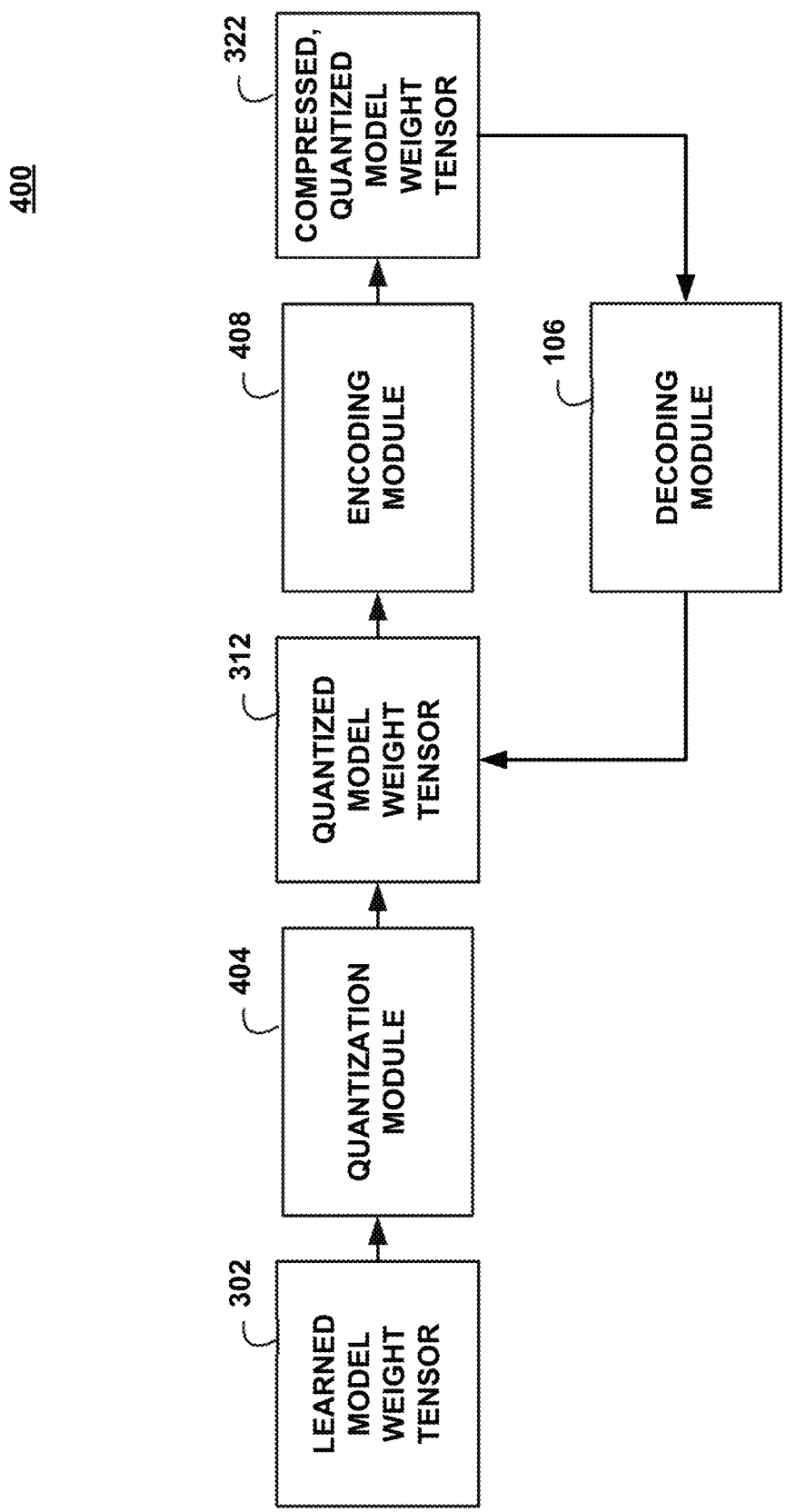
FIG. 4 provides an example of model-weight compression using quantization and encoding and decoding of model weights in accordance with one or more embodiments of the present disclosure.

FIG. 4 provides an example of model-weight compression using quantization and encoding and decoding of model weights in accordance with one or more embodiments of the present disclosure. In accordance with one or more embodiments, in example 400, learned model weight tensor 302 can comprise model weight values learned by training a machine model using a machine learning algorithm, as discussed. In example 400 of FIG. 4, the model weights in learned model weight tensor 302 can be 32-bit floating point values.

As discussed, in accordance with one or more embodiments, quantization module 404 can use a quantization technique, such as symmetric quantization, to map the first range of model weights from learned model weight tensor 302 (having a first precision) to a second range of model weights from quantized model weight tensor 312 (having a second precision). In example 400, the model weights in quantized model weight tensor 312 can be 8-bit integer values.

Quantized model weight tensor 312 can become input to encoding module 408, which can be configured to generate compressed, quantized model weight tensor 322. In accordance with one or more embodiments, encoding module 408 can comprise a video codec (e.g., an HVEC encoder/decoder), which can be used to generate compressed, quantized model weight tensor 322, as discussed. In example 400, each model weight in compressed, quantized model weight tensor 322 corresponds to (and is generated from a compression of) a quantized model weight (from quantized model weight tensor 312).

As shown in example 400, quantized model weight tensor 312 can be generated by decoding module 106 using compressed, quantized model weight tensor 322 as input. In accordance with one or more embodiments, as discussed, decoding module 106 can be a component of content detection engine 102 (in example 100 of FIG. 1). By way of a non-limiting example, quantized model weight tensor 312 can correspond to an FCL of one of the trained models used by components of content detection engine 102 and streaming commerce engine 122.

While encoding module 408 and decoding module 106 are shown as separate components, in accordance with one or more embodiments, encoding module 408 and decoding module 106 can be the same component.

In accordance with one or more embodiments, decoding module 106 generates quantized model weight tensor 312 for use by a corresponding model (e.g., CNN 314) to make inferences based on model input. By way of a non-limiting example, decoding module 106 can decode each compressed, quantized model weight tensor 322 corresponding to an FCL of CNN 324, which yields CNN 314. CNN 314 can be used to generate model output. CNN 314 can be any machine model in accordance with one or more embodiments discussed herein.

Figure 5:
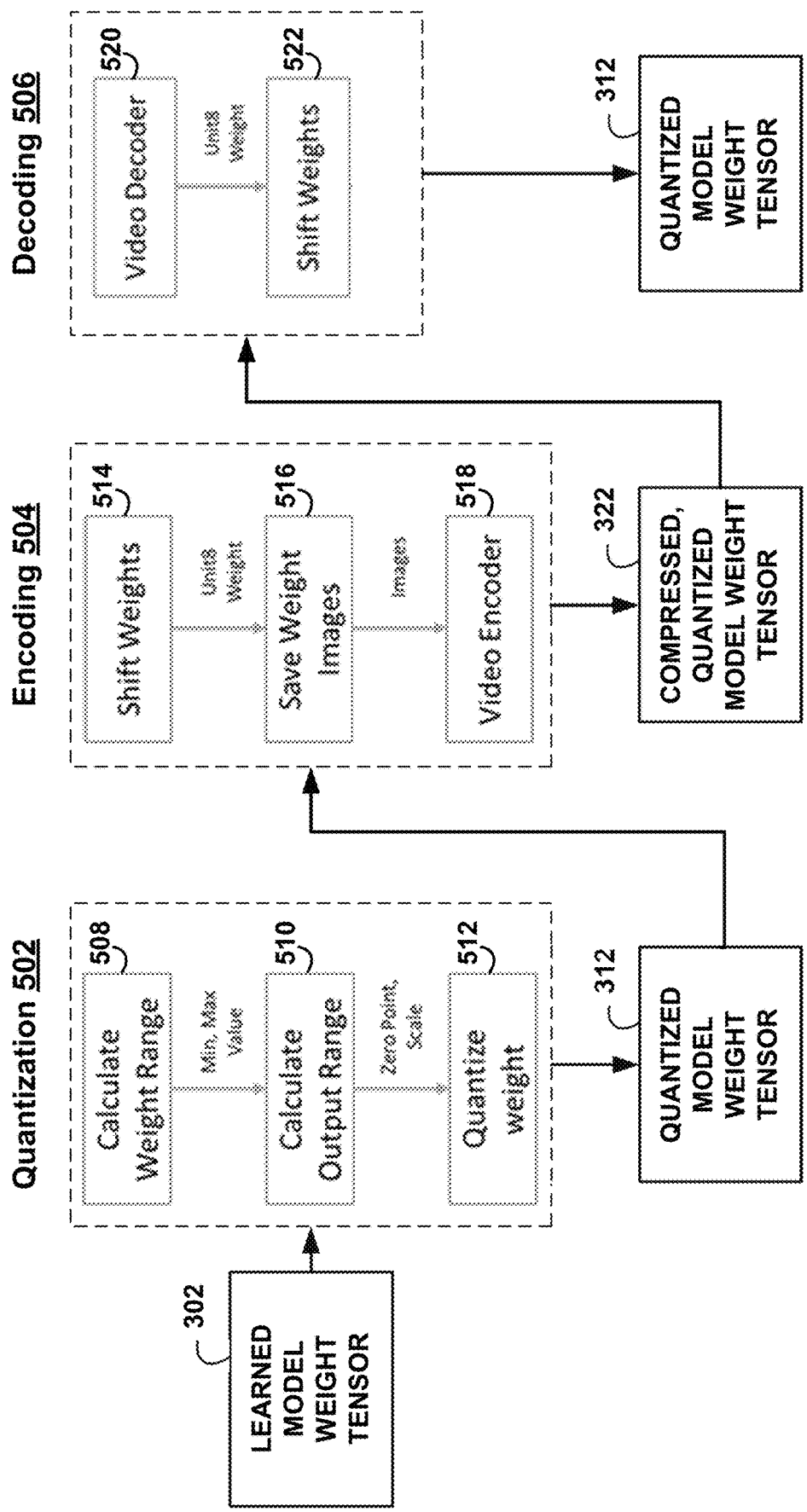
FIG. 5 provides examples of quantization, encoding and decoding in accordance with one or more embodiments of the present disclosure.

FIG. 5 provides examples of quantization, encoding and decoding in accordance with one or more embodiments of the present disclosure. In example 500, quantization 502 can receive learned model weight tensor 302 and generate quantized model weight tensor 312. Quantization 502 can be performed by quantization module 404. Quantization 502 can calculate a weight range 508, calculate an output range 510 and quantize each weight 512 of learned model weight tensor 302 using a quantization technique, as discussed.

Encoding 504 can use quantized model weight tensor 312 to generate compressed, quantized model weight tensor 322. Encoding 504 can be performed by encoding module 408. Encoding 504 can shift weights 514, save weight images 516 and use a video encoder 518. By way of a non-limiting example, encoding 504 can shift weights 514 to convert each quantized model weight (in quantized model weight tensor 312) to an unsigned-integer model weight. The result can be an unsigned-integer model weight tensor (not shown) comprising unsigned-integer model weights, which can be saved 516 and used by video encoder 518. Video encoder 518 can treat the unsigned-integer model weight tensor like image data and convert the input to compressed, quantized model weight tensor 322.

Decoding 506 can use compressed, quantized model weight tensor 322 to generate quantized model weight tensor 312. Decoding 506 can be performed by decoding module 106. Compressed, quantized model weight tensor 322 can be input to video decoder 520, which can treat it like encoded image data and convert it to an unsigned-integer model weight tensor (not shown). Shift weights 522 can take the unsigned-integer model weight tensor and convert each unsigned integer to an integer to generate quantized model weight tensor 312. As discussed, quantized model weight tensor 312 can be used by a trained machine model used by content detection engine 102 or streamed commerce engine 122.

Figure 6:
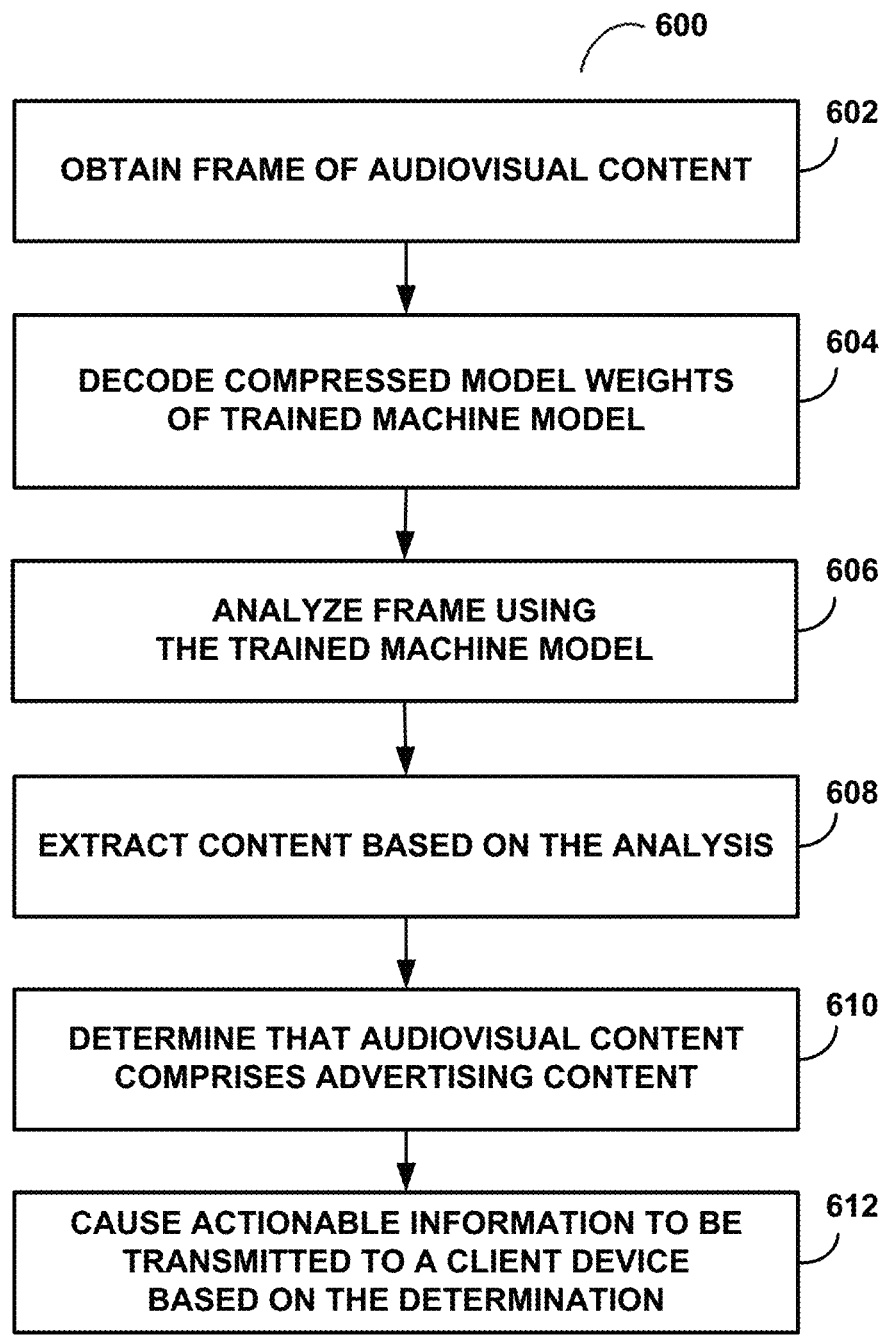
FIG. 6 provides an example of a frame analysis, content detection and streaming commerce process flow used in accordance with one or more embodiments of the present disclosure.

FIG. 6 provides an example of a frame analysis, content detection and streaming commerce process flow used in accordance with one or more embodiments of the present disclosure. The frame analysis, content detection and streaming commerce flow 600 can be performed by content detection engine 102 and streaming commerce engine 122. As discussed herein, content detection engine 102 can analyze a frame of audiovisual content, extract content based on the analysis and streaming commerce engine 122 can use the extracted content to make a determination that the audiovisual content comprises a certain type of content (e.g., advertising content) and cause actionable information (e.g., a user interface) to be transmitted to (and displayed at) a client device of the user in response.

At step 602, a frame of audiovisual content is obtained. By way of a non-limiting example, a frame, such as frame 104, can be obtained by content detection engine 102. At step 604, compressed model weights of a trained machine model can be decoded. By way of a non-limiting example, decoding module 106 of content detection engine 102 can use decoding module 106 to generate quantized model weight tensor 312 for at least one trained machine model, such as a trained machine model used by logo detector 108, text detector 110, audio detector 112 and/or text engine 114. By way of a further non-limiting example, the trained machine model can be CNN 314.

At step 606, the frame can be analyzed using the trained machine model. At step 608, content can be extracted based on the analysis. By way of a non-limiting example, the trained machine model (used at one or both of steps 606 and 608) can be a component of logo detector 108 used to analyze image data and extract image portions that comprise a logo from frame 104, a component of text detector 110 used to detect (and extract) text from the image data from frame 104, or a component of audio detector 112 used to detect (and extract) text from the audio data from frame 104. By way of a further non-limiting example, the trained model can be a component of text engine 114 trained to analyze text generated from frame 104 and identify POS information and/or name entity information.

At step 610, a determination can be made that the audiovisual content comprises a certain category of content (e.g., advertising content). By way of a non-limiting example, step 610 can be performed by streaming commerce engine 122, which comprises streaming commerce module 202 and label voting classifier 204, to make such a determination.

At step 612, actionable information can be caused to be transmitted to (and/or displayed at) a client device based on the determination. By way of a non-limiting example, the actionable information can be a user interface that can be caused to be transmitted to (and/or displayed at) the client device in response to the determination made at step 612. By way of a further non-limiting example, transmission of the user interface can cause the user interface to be displayed at the client device in response to the determination made at step 612. By way of yet another non-limiting example, step 612 can be performed by streaming commerce engine 122 and the user interface can comprise user interface 210 to be displayed on user equipment, client device, etc. The user interface 210 can comprise a set of controls, where each control enables a user to take an action in connection with detected category of content (e.g., advertising content), as discussed.

Figure 7:
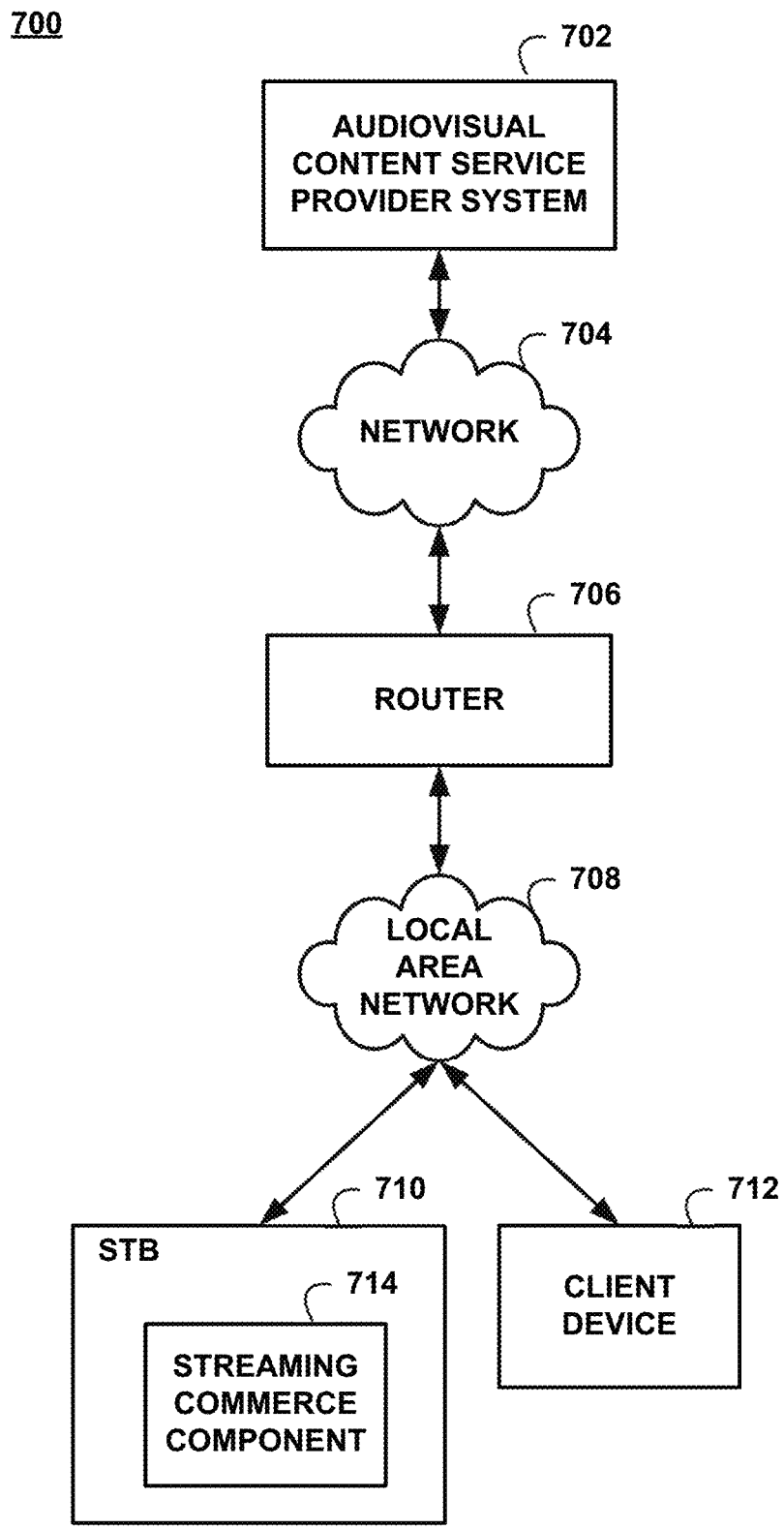
FIG. 7 is a schematic diagram illustrating an example of an environment in which the systems and methods disclosed herein could be implemented according to some embodiments of the present disclosure.

FIG. 7 is a schematic diagram illustrating an example of an environment in which the systems and methods disclosed herein could be implemented according to some embodiments of the present disclosure. As shown, environment 700 can include an audiovisual content service provider system 702, a router 706, a STB (set-top-box) 710 and a client device 712.

Audiovisual content service provider system 702 can communicate with (e.g., transmit audiovisual content, streaming media streams to) STB 710 and client device 712 via network 704, router 706 and local area network 708.

In accordance with one or more embodiments, audiovisual content service provider system 702 can be a television service provider configured to provide television service for access by one or more users (e.g., a user associated with client device 712). The television service may include a subscription television service and/or any other television service that provides access to television programming, which can be in the form of audiovisual content, streaming content, media streams and the like, via router 706 by way of network 704.

Network 704 can include one or more wide area networks (e.g., the Internet), wireless communication networks, mobile telephone networks (e.g., cellular telephone networks), closed media networks, open media networks, subscriber television networks, and/or any other networks capable of carrying data (e.g., audiovisual content, streaming media, etc.) and/or communications signals between audiovisual content service provider system 702 and media processing devices, such as STB 710 and client device 712.

Local area network 708 may include any suitable network that connects network-enabled devices, such as STB 710 and client device 712. For example, local area network 708 can include a wired and/or wireless network provided by router 706.

Audiovisual content service provider system 702, router 706, client device 712 and STB 710 can communicate using any communication platforms and technologies suitable for transporting data (e.g., audiovisual content, streaming content or the like) and/or communication signals, including known communication technologies, devices, media, and protocols supportive of remote communications, examples of which include, but are not limited to, data transmission media, communications devices, Internet Protocol ("IP), Transmission Control Protocol ("TCP"), User Datagram Protocol ("UDP), Hypertext Transfer Protocol ("HTTP), Hypertext Transfer Protocol Secure ("HTTPS), Real-Time Transport Protocol ("RTP), Session Initiation Protocol ("SIP), Simple Object Access Protocol ("SOAP), Extensible Mark-up Language (XML) and variations thereof, radio frequency ("RF") signaling technologies, Code Division Multiple Access ("CDMA') technologies, Global System for Mobile Communications ("GSM) technologies, Time Division Multiple Access ("TDMA) technologies, Short Message Service ("SMS), Multimedia Message Service ("MMS"), wireless communication technologies, Internet communication technologies, media streaming technologies, media download technologies, and other suitable communications technologies.

Router 706 and/or STB 710 can be associated with (e.g., maintained and/or provided by) audiovisual content service provider. Router 706 can include, for example, a broadband home router configured to receive audiovisual content from audiovisual content service provider system 702 via network 704 and distribute the audiovisual content to STB 710 and/or client device 712 via local area network 708.

STB 710 and client device 712 can be computing devices configured to receive an audiovisual content and present the audiovisual content by displaying it on a display screen (not shown). By way of some non-limiting examples, client device 712 can be a desktop computer, tablet, smartphone, smart TV, gaming console or any other type of computing device. In accordance with one or more embodiments, STB 710 can be a DVR (digital video recorder) with DVR storage capabilities.

In accordance with one or more embodiments, STB 710 (or client device 712) can be configured to include a streaming commerce component 714, which can comprise content detection engine 102 and streaming commerce engine 122. Streaming commerce engine 122 can be configured to cause actionable information (e.g., user interface 210) to be transmitted to (and/or displayed at) client device 712. Transmission can result in the actionable information (e.g., user interface 210) being displayed on a display of client device 712, as discussed above.

Figure 8:
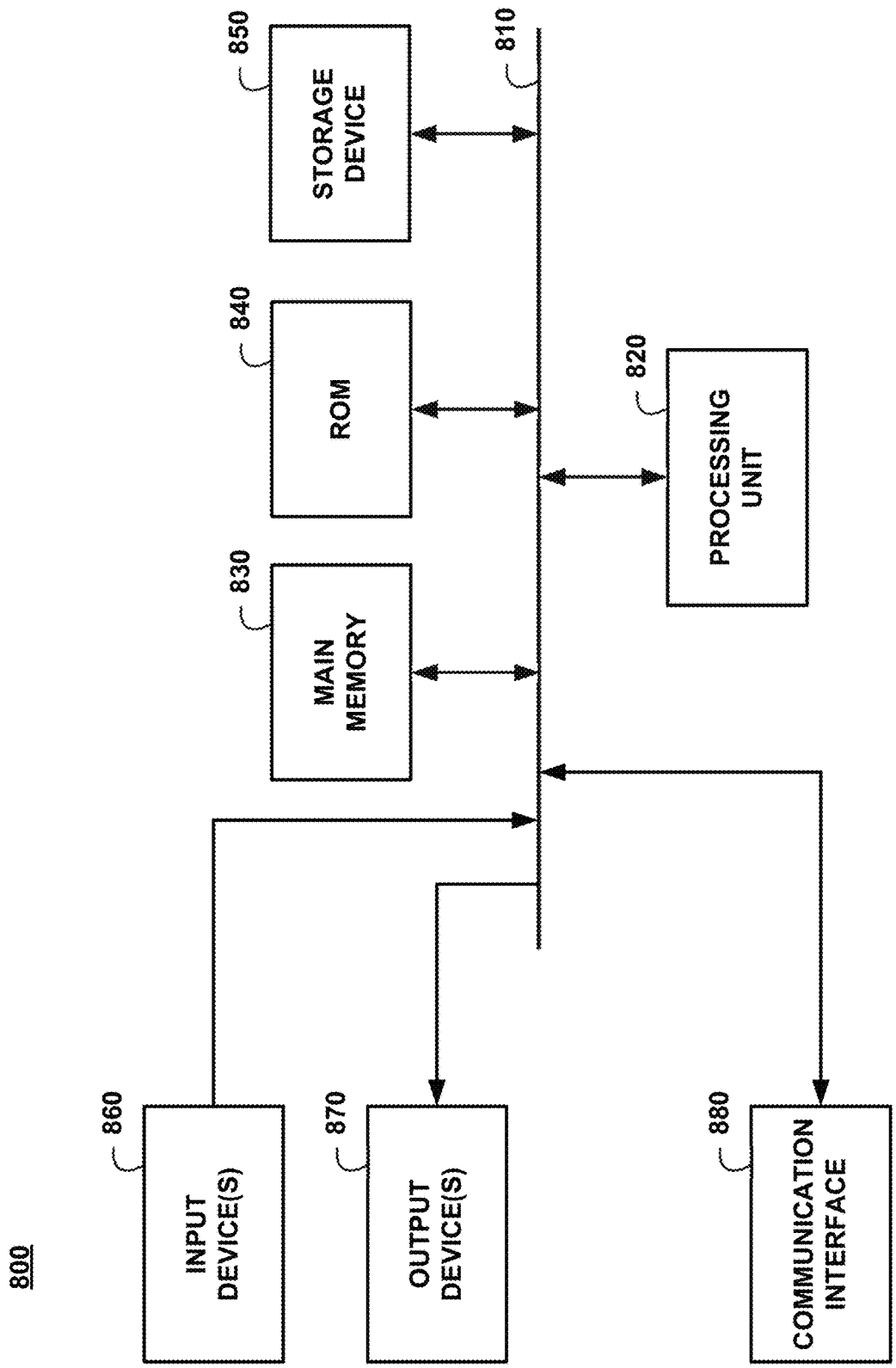
FIG. 8 provides a diagram of exemplary components of a computing device in accordance with one or more embodiments of the present disclosure.

FIG. 8 provides a diagram of exemplary components of a computing device in accordance with one or more embodiments of the present disclosure. Router 706, STB 710 and client device 712 can be configured the same as, or similar to, device 800.

Device 800 can include a bus 810, a processing unit 820, a main memory 830, a read only memory (ROM) 840, a storage device 850, an input device(s) 860, an output device(s) 870, and a communication interface 880. Bus 810 can include a path that permits communication among the elements of device 800.

Processing unit 820 can include one or more processors or microprocessors which may interpret and execute instructions. Additionally, or alternatively, processing unit 820 can include processing logic that executes one or more operations of a process(es).

Main memory 830 can include a random access memory (RAM) or another type of dynamic storage device that may store information and, in some implementations, instructions for execution by processing unit 820. ROM 840 can include a ROM device or another type of static storage device (e.g., Electrically Erasable Programmable ROM (EEPROM)) that may store static information and, in some implementations, instructions for use by processing unit 820. Storage device 850 can include a magnetic, optical, and/or solid state (e.g., flash drive) recording medium and its corresponding drive. Main memory 830, ROM 840 and storage device 850 can each be referred to herein as a "non-transitory computer-readable medium" or a "non-transitory storage medium." The processes/methods set forth herein can, at least in part, be implemented as instructions that are stored in main memory 830, ROM 840 and/or storage device 850 for execution by processing unit 820.

Input device 860 can include one or more mechanisms that permit an operator (e.g., a user) to input information to device 800, such as, for example, a keypad or a keyboard, a display with a touch sensitive panel, voice recognition and/or biometric mechanisms, etc. Output device 870 can include one or more mechanisms that output information to the operator, including a display, a speaker, etc. Communication interface 880 may include one or more transceivers that enable device 800 to communicate with other devices and/or systems. For example, communication interface 880 may include wired and/or wireless transceivers for communicating via local area network 708.

The configuration of components of device 800 illustrated in FIG. 8 is for illustrative purposes only. Other configurations may be implemented. Therefore, device 800 can include additional, fewer and/or different components than those depicted in FIG. 8.

At least some embodiments of the present disclosure are related to the use of device 800 for implementing some or all of the techniques described herein. According to one embodiment, those techniques are performed by device 800 in response to processing unit 820 executing one or more sequences of one or more processor instructions contained in main memory 830. Such instructions, also called computer instructions, software and program code, may be read into main memory 830 from another computer-readable medium, such as a storage device 850 or a network link (not shown). Execution of the sequences of instructions contained in main memory 830 causes processing unit 820 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
    obtaining, by a computing device, a frame of audiovisual content;
    using, by the computing device, a video decoder to decode compressed model weights of at least one trained model for analyzing the frame;
    using, by the computing device, the at least one trained model with the decoded weights to analyze the frame and extract content based on the analysis;
    using, by the computing device, the extracted content to make a determination that the audiovisual content comprises a category of content; and
    causing, by the computing device, actionable information to be transmitted to a client device of a user in response to the determination that the audiovisual content comprises the category of content.

2. The method of claim 1, wherein the at least one trained model is a tiny machine learning (tinyML) model.

3. The method of claim 1, wherein the at least one trained model comprises a first machine model trained to detect image data representing a product logo in the extracted content, a second machine model trained to detect text in image data from the frame and a third machine model trained to detect text in audio data from the frame.

4. The method of claim 3, further comprising:
    analyzing, by the computing device, the text detected in the audiovisual content and identifying part-of-speech (POS) information and named entity information based on the analysis.

5. The method of claim 4, using the extracted content to make a determination that the audiovisual content comprises a category of content further comprising:
    analyzing, by the computing device, information comprising the image data representing a product logo, the POS information and named entity information and identifying a product based on the analysis.

6. The method of claim 5, wherein a voting classifier is used in analyzing the information to identify the product.

7. The method of claim 6, analyzing the information further comprising:
    obtaining, by the computing device, from the voting classifier, a probability that the analyzed information corresponds to the identified product; and
    making, by the computing device, a determination that the probability satisfies a threshold probability.

8. The method of claim 5, wherein the information being analyzed further comprises information generated from content extracted from a number of other frames of the audiovisual content using the at least one trained model.

9. The method of claim 4, wherein analyzing the text comprises using a natural language POS tagger and the POS information comprises a part-of-speech tag for each word from the analyzed text, and wherein analyzing the text comprises using a Named Entity Recognizer (NER) and the name entity information comprises each named entity identified from the NER analysis.

10. The method of claim 3, wherein the second machine model is trained to detect irregularly-shaped text.

11. The method of claim 1, wherein the actionable information comprises a user interface comprising a set of controls, each control enabling the user to take an action in connection with the determined category of content, and wherein the determined category of content comprises advertising content.

12. The method of claim 11, wherein the action enabled by a control from the set of controls is selected from one of the following: obtain information about an advertised product, add the advertised product to an online shopping cart, buy the advertised product, specify settings, or close the user interface.

13. The method of claim 1, wherein a video encoder is used to generate the compressed model weights using quantized model weights.

14. The method of claim 1, the at least one trained model comprises a convolutional neural network (CNN), the model weights corresponding to at least one fully connected layer of the CNN.

15. A non-transitory computer-readable storage medium tangibly encoded with computer-executable instructions that when executed by a processor associated with a computing device perform a method comprising:
    obtaining a frame of audiovisual content;
    using a video decoder to decode compressed model weights of at least one trained model for analyzing the frame;
    using the at least one trained model with the decoded weights to analyze the frame and extract content based on the analysis;
    using the extracted content to make a determination that the audiovisual content comprises a category of content; and
    causing actionable information to be transmitted to a client device of a user in response to the determination that the audiovisual content comprises the category of content.

16. The non-transitory computer-readable storage medium of claim 15, wherein the at least one trained model comprises a first machine model trained to detect image data representing a product logo in the extracted content, a second machine model trained to detect text in image data from the frame and a third machine model trained to detect text in audio data from the frame.

17. The non-transitory computer-readable storage medium of claim 16, the method further comprising:
    analyzing the text detected in the audiovisual content and identifying part-of-speech (POS) information and named entity information based on the analysis.

18. The non-transitory computer-readable storage medium of claim 17, using the extracted content to make a determination that the audiovisual content comprises a category of content further comprising:
    analyzing information comprising the image data representing a product logo, the POS information and named entity information and identifying a product based on the analysis.

19. The non-transitory computer-readable storage medium of claim 18, wherein the information being analyzed further comprises information generated from content extracted from a number of other frames of the audiovisual content using the at least one trained model.

20. A system comprising:
a processor, configured to:
obtain a frame of audiovisual content;
use a video decoder to decode compressed model weights of at least one trained model for analyzing the frame;
using the at least one trained model with the decoded weights to analyze the frame and extract content based on the analysis;
use the extracted content to make a determination that the audiovisual content comprises a category of content; and
cause actionable information to be transmitted to a client device of a user in response to the determination that the audiovisual content comprises the category of content.

* * * * *